(12) United States Patent
Zimmerman et al.

(10) Patent No.: US 6,352,730 B1
(45) Date of Patent: Mar. 5, 2002

(54) SUSPENSION FOR ADDING A CONTROLLED AMOUNT OF INGREDIENT TO A FOOD PRODUCT

(75) Inventors: Stephen Paul Zimmerman, Wyoming; Gerald McDonald, Fairfield, both of OH (US)

(73) Assignee: The Procter & Gamble Co., Cincinnati, OH (US)

( * ) Notice: Subject to any disclaimer, the term of this patent is extended or adjusted under 35 U.S.C. 154(b) by 0 days.

(21) Appl. No.: 09/446,547

(22) PCT Filed: Jul. 2, 1998

(86) PCT No.: PCT/US98/13851

§ 371 Date: Dec. 22, 1999

§ 102(e) Date: Dec. 22, 1999

(87) PCT Pub. No.: WO99/01039

PCT Pub. Date: Jan. 14, 1999

Related U.S. Application Data (60) Provisional application No. 60/051,509, filed on Jul. 2, 1997.

(51) Int. Cl.[7] .......................... A23D 9/007; A23D 1/08; A23L 1/29

(52) U.S. Cl. .................... 426/73; 426/302; 426/307; 426/601; 426/611

(58) Field of Search ................. 426/611, 601, 426/72, 74, 541, 73, 302, 307, 310

(56) References Cited

U.S. PATENT DOCUMENTS

| | | | |
|---|---|---|---|
| 2,380,166 A | * 7/1945 | Griffin | |
| 2,508,393 A | * 5/1950 | Jaeger | |
| 3,702,307 A | * 11/1972 | Norris | |
| 3,992,556 A | 11/1976 | Kovacs et al. | 426/72 |
| 3,993,580 A | * 11/1976 | Galusky | 426/417 |
| 4,005,196 A | 1/1977 | Jandacek et al. | 424/180 |
| 4,034,083 A | * 7/1977 | Mattson | 424/180 |
| 4,118,390 A | 10/1978 | Wu | |
| 4,804,546 A | * 2/1989 | Sawhill | 426/69 |
| 4,966,779 A | 10/1990 | Kirk | 426/72 |
| 4,983,413 A | * 1/1991 | Meyer et al. | 426/589 |
| 4,986,475 A | 1/1991 | Spadafora et al. | 239/218.5 |
| 5,077,069 A | * 12/1991 | Chang et al. | 426/541 |
| 5,085,884 A | 2/1992 | Young et al. | 426/611 |
| 5,248,509 A | 9/1993 | Bruin | 426/72 |
| 5,290,481 A | * 3/1994 | Todd, Jr. | 252/407 |
| 5,296,249 A | * 3/1994 | Todd, Jr. | 426/541 |
| 5,298,268 A | 3/1994 | Maegli | 426/93 |
| 5,520,942 A | 5/1996 | Sauer | 426/289 |
| 5,747,080 A | 5/1998 | Lemke et al. | 426/72 |
| 5,786,012 A | 7/1998 | Peterson | 426/231 |

FOREIGN PATENT DOCUMENTS

| | | | |
|---|---|---|---|
| DE | 4423997 A1 | 1/1996 | .......... A21D/15/00 |
| EP | 354600 A | 2/1990 | .......... A23D/9/00 |
| FR | 2352548 | * 1/1978 | |
| NO | 91/15964 A | * 10/1991 | |
| NO | 98/00038 A | * 1/1998 | |
| WO | WO 91/15964 A | 10/1991 | .......... A23D/9/00 |
| WO | WO 92/10941 | * 7/1992 | |

OTHER PUBLICATIONS

Ascorbic Acid. 1992. The American Heritage Dictionary of the English Language, 3rd Edition. Houghton Mifflin Company.*

Nadison, George, "Seasoning blends for expanded snacks," Baking Industries Journal, vol. 2, No. 10, pp. 33, 35 (1970).

* cited by examiner

*Primary Examiner*—Carolyn Paden
(74) *Attorney, Agent, or Firm*—Erich D. Hemm; Carl J. Roof (57) ABSTRACT

An improved method of adding food-additive ingredients to a food product, particularly a reduced fat fried snack product, and an ingredient suspension containing a flowable edible, preferably a nondigestible fat, and food-additive ingredients. The method consists of suspending the encapsulated or powdered ingredients in the flowable edible fat, and applying the suspension in a controlled amount to the surface of a food product. The preferred food product is a fabricated reduced fat or fat-free potato chip which is a fried snack made by frying a dough in a nondigestible fat to a moisture content of less than 5%. The ingredient suspension is applied to the surface of the fried snack soon after emerging from the fryer. The food product has a light, crispy, improved crunchy texture, improved flavor and a fat content of from about 20% to about 38% nondigestible fat, and is fortified with food-additive ingredients.

6 Claims, 1 Drawing Sheet

FIG. 1

SUSPENSION FOR ADDING A CONTROLLED AMOUNT OF INGREDIENT TO A FOOD PRODUCT

This application is the National Stage of PCT/US98/13851, filed Jul. 2, 1998, which claims the benefit of U.S. Provisional Application No. 60/051,509, filed Jul. 2, 1997.

TECHNICAL FIELD

This application relates to an ingredient suspension and an improved method of delivering ingredients to food products to provide aesthetic, nutrient, and product performance benefits to the food product, as well as an improved means of delivering such ingredients to food product units at very low levels with accuracy and consistency. In particular, this application relates to a process for preparing a flowable ingredient suspension and ingredient-fortified food products by applying the ingredient suspension onto the surface of the fihed or cooked pieces of the food.

BACKGROUND OF THE INVENTION

A wide variety of starch and protein-based snack food products are presently available to the consumer. Many of these products are in the form of chips, strips, and extruded tubular pieces. Some of these products are expanded or puffed and contain a cellular or honeycombed internal structure. In addition, most of the present-day snack products contain a fairly high level of fat, either in the form of separately added ingredients, such as cheese, or in the form of fats imparted to the product during cooking, as in the case of corn or potato chips. Fat improves the flavor and palatability of these products. The use of nondigestible fats to replace the fat provides a lower calorie, good tasting snack.

Ingredient addition to snack products can be difficult due to a variety of product interactions, physical properties, environmental conditions, and process feasibility considerations. Often the situation is complicated by the high temperature of the application or the fact that there is a moving ingredient stream being applied to a moving product stream.

The nondigestible fat needs to be fortified with fat soluble vitamins to compensate for any loss of these vitamins by absorption into the nondigestible fats which are then excreted and not absorbed by the body. Vitamins, for example, have been applied to salted snacks as a powder, which can result in the loss of vitamin material. It can be difficult to obtain accurate and precise levels of addition applying vitamins to food products as a powder. The process is complicated by the relatively low amounts of material to be added, making flow control difficult. The powder composed of discrete particles can flow randomly with high variability easily influenced by environmental conditions. Adhesion to the food product can be low due to dissimilar surface tension or the governing physics of the application process that cause the particles to strike then repel away from the product surface.

Ingredient powders can be blended with salt, seasonings, or other particulate admixtures to act as carriers to improve metering capability. Segregation is a problem that increases the non-uniformity of the application and limits the maximum powder particle size to about 250 microns, preferably less than 150 microns. The lower particle size reduces, but does not eliminate segregation induced variability due to differences in total particle size distribution, bulk density, and particle shape between the vitamins and carrier. The salt or seasoning can preferentially adhere to the food product surface lowering the vitamin application rate further by competing for available space.

Addition with a salt or seasoning carrier has the disadvantage of coupling the vitamin addition control strategy with that of the carrier. The two materials can not be independently controlled which can lead to flavor or vitamin level problems. A further consideration with salt blends is that the salt will potentate undesirable vitamin flavors due to intimate contact during eating.

Many ingredients need to be added at extremely small levels that make accurate metering infeasible. Many flavors and nutrients are required in parts per million to parts per trillion levels.

The practice of over compensation, increasing the vitamin application rate or level in the carrier due to low adhesion, can leads to other undesirable effects, such as off-flavors. While over compensation can lead to higher average application levels, it also causes the upper tail of the ingredient level distribution to increase exponentially, in some cases double or triple the average level.

Many ingredients are sensitive to heat or oxygen exposure. Non-caloric sweeteners such as aspartame degrade upon heating. Application post heating is desirable to preserve ingredient quality. Oxidatively sensitive ingredients are difficult to maintain as powders since upon flow, intimate contact with air occurs. Providing these materials with a carrier with low oxygen solubility serving as a protective barrier provides a two fold advantage to improve metering capability and ingredient protection.

Imiscible liquids can be difficult to use. Separation will occur when added to low viscosity fluid systems. When used in powdered applications, undesirable wetting of the solid particulates can occur.

Environmental factors also govern the feasibility of applying many solid materials, particularly if they have the capability to act as humectants. Many seasoning applications contain reducing sugars or protein based materials that readily hydrate and form agglomerates which can prevent flow or create undesirable adhesion to process equipment.

Ingredients added for one purpose can have undesirable effects on other product quality attributes. Nutrients such as vitamins or minerals provide dietary benefits, but can provide off flavors. Vitamin A for example can provide undesirable flavors when added at recommended daily levels. Ideally, the ingredient carrier would provide some taste masking properties to allow higher levels to be used with less objectionable flavor properties. The addition of calcium carbonate to dough can create leavening and potential product texture problems upon heating. Addition post heating would eliminate uncontrolled product impacts.

Occupational health issues are a concern with the addition of some ingredients like protein based flavors, vitamins, or capcaisin which is used to make spicy foods by stimulating trigeminal nerves in the tongue. Airborne levels are typically strictly controlled to limit inhalation exposure.

PCT Patent Application US97/11400, filed Jul. 2, 1995 now WO 98/00038, published Jan. 8, 1998, discloses a method of fortifying food products with vitamins by applying to food products a suspension of vitamins in a flowable edible oil.

It is an object of this invention to provide an improved method of adding ingredients to food products, and particularly to fried snacks containing a nondigestible fat. It is a further object to provide a ingredient suspension containing an edible oil base and ingredients suspended therein, which is easily added to food products.

SUMMARY OF THE INVENTION

The present invention relates to a suspension of a food-additive ingredient in a flowable edible fat, the edible fat being a nondigestible fat, a digestible fat, or a mixture thereof. The suspension can be applied to warmed food products more evenly and efficiently than conventional powdered or liquid vitamins.

The present invention also relates to an improved method of adding food-additive ingredients to a food product, particularly a reduced fat fried snack product. The method comprises suspending the ingredients in a flowable edible fat, preferably a semi-solid nondigestible fat with reduced viscosity; optionally heating the ingredient suspension to a flowable temperature; and applying the ingredient suspension in a controlled amount to the surface of a food product. A preferred food product is a fabricated potato chip. The ingredient suspension is preferably applied when the chip is still hot, such as when just out of the fryer, oven or extruder.

DETAILED DISCLOSURE OF THE INVENTION

All percentages and proportions are "by weight" or "by dry weight" unless otherwise specified.

This invention relates to a method of quantitative, preferably precise, addition of food-additive ingredient to foods, preferably potato chips or snacks, by adding an ingredient suspension onto the surface of the foods. Preferably the ingredients are added to a flowable edible fat, preferably a nondigestible fat such as a sucrose fatty acid polyester, to make the suspension. A preferred sucrose fatty acid polyester is olestra, which is sold under the Olean® brand by The Procter & Gamble Company, Cincinnati, Ohio.

The invention enables controlled addition of such ingredients to the product with little or no loss or degradation of the ingredients. The level of control provided by this suspension eliminates the need to excessively add amounts of the ingredient to compensate otherwise for losses and processing variations. Over-addition of ingredients can result in numerous other problems, such as objectionable off-flavors, and higher cost.

A. Definitions

As used herein, "ingredient suspension" is used to refer to a blend of powdered fat soluble vitamins, preferably A, B, C, D, E and K in a suspension of a flowable edible fat or oil, preferably a semi-solid, nondigestible fat.

The term "nondigestible fat" refers to those edible fats that are partially or totally nondigestible. Such edible fats can be polyol fatty acid polyesters, such as olestra, and polyol ethoxylates. The term "polyol" means a polyhydric alcohol containing at least 4, preferably from 4 to 11 hydroxyl groups. Polyols include sugars (i.e., monosaccharides, disaccharides, and trisaccharides), sugar alcohols, other sugar derivatives (i.e., alkyl glucosides), polyglycerols such as diglycerol and triglycerol, pentaerythritol, sugar ethers such as sorbitan and polyvinyl alcohols. Specific examples of suitable sugars, sugar alcohols and sugar derivatives include xylose, arabinose, ribose, xylitol, erythritol, glucose, methyl glucoside, mannose, galactose, fructose, sorbitol, maltose, lactose, sucrose, raffinose, and maltotriose.

The term "polyol fatty acid polyester" means a polyol having at least 4 fatty acid ester groups. It is not necessary that all of the hydroxyl groups of the polyol be esterified, but it is preferable that disaccharide molecules contain no more than 3 unesterified hydroxyl groups for the purpose of being nondigestible. Typically, substantially all, e.g., at least about 85%, of the hydroxyl groups of the polyol are esterified. In the case of sucrose polyesters, typically from about 7 to 8 of the hydroxyl groups of the polyol are esterified.

The polyol fatty acid esters typically contain fatty acid radicals typically having at least 4 carbon atoms and up to 26 carbon atoms. These fatty acid radicals can be derived from naturally occurring or synthetic fatty acids. The fatty acid radicals can be saturated or unsaturated, including positional or geometric isomers, e.g., cis- or trans- isomers, and can be the same for all ester groups, or can be mixtures of different fatty acids.

As used herein "starch-based materials" refer to naturally occurring, high polymeric carbohydrates composed of glucopyranose units, in either natural, dehydrated (e.g., flakes, granules, meal) or flour form. The starch-based materials include, but are not limited to, potato flour, potato granules, corn flour, masa corn flour, corn grits, corn meal, rice flour, tapioca, buckwheat flour, rice flour, oat flour, bean flour, barley flour, tapioca, as well as modified starches, native starches, and dehydrated starches, starches derived from tubers, legumes and grain, for example cornstarch, wheat starch, rice starch, waxy corn starch, oat starch, cavassa starch, waxy barley, waxy rice starch, glutinous rice starch, sweet rice starch, amioca, potato starch, tapioca starch, cornstarch, oat starch, cassava starch, rice starch, wheat starch, and mixtures thereof.

As used herein "Brabender Units (BU)" is an arbitrary unit of viscosity measurement roughly corresponding to centipoise.

As used herein, "modified starch" refers to starch that has been physically or chemically altered to improve its ftmctional characteristics. Suitable modified starches include, but are not limited to, pregelatinized starches, low viscosity starches (e.g., dextrins, acid-modified starches, oxidized starches, enzyme modified starches), stabilized starches (e.g., starch esters, starch ethers), cross-linked starches, starch sugars (e.g. glucose syrup, dextrose, isoglucose) and starches that have received a combination of treatments (e.g., cross-linking and gelatinization) and mixtures thereof.

As used herein, the term "added water" refers to water which has been added to the dry dough ingredients. Water which is inherently present in the dry dough ingredients, such as in the case of the sources of flour and starches, is not included in the added water.

B. The Edible Fat

Any nondigestible fat can be used to prepare the ingredient suspension, so long as the ingredients can be adequately mixed and made to be suspended in the fat, and so long as the resulting nondigestible fat ingredient suspension is sufficiently flowable to permit application thereof to the food product. The nondigestible fat can be either a liquid, a solid, or a semi-solid (partially liquid fat and partially solid fat) at the usage temperature. Preferred is a semi-solid polyol fatty acid polyester. A preferred semi-solid nondigestible fat is a blend of a liquid nondigestible fat having a melting point below body temperature, and a solid nondigestible fat having a melting point above body temperature. This nondigestible fat must be capable of becoming flowable and pumpable on application of shear or low temperature heating when the nondigestible fat is below it's melting point, in order to allow pumping and application through the nozzle and onto the food product. At the same time, the nondigestible fat must be viscous enough to suspend easily the solid ingredients.

The nondigestible fat preferably has a viscosity of not less than 1.0 poise, more preferably not less than 5.0 poise, at 100° F. (37.8° C.) after 10 minutes of steady shear at a rate of 10 seconds$^{-1}$. Shear viscosity is measured as described in U.S. Pat. No. 5,021,256 issued to Guffey et al. Jun. 4, 1991 at Column 12, lines 10–45, herein incorporated by reference.

A highly preferred nondigestible fat is a blend of liquid and solid sucrose fatty acid polyesters of saturated and unsaturated fatty acids having from 8 to 24 carbon atoms. These materials are described in U.S. Pat. No. 5,422,131 issued to Elsen et al. (1995) and in U.S. Pat. No. 5,085,884, issued to Young, et al. U.S. Pat. No. 5,306,514 and U.S. Pat. No. 5,306,516 issued to Letton et al. (1994) also describes compositions which can be used herein. These preferred nondigestible oil compositions preferably form into a stiffened material when cooled from a completely melted state to a temperature below 37° C. in a substantially quiescent state (i.e., without agitation). The stiffened material is particularly effective in retaining large quantities of liquid nondigestible oil, and thus inhibiting or preventing passive oil loss of the nondigestible oil through the body of the consumer.

A digestible fat can also be used in admixture with or replaced entirely with the nondigestible fat, but it will contribute some calories. Ingredient fortification is particularly useful when fabricating snacks and other foods with nondigestible oils and fats. Such snacks and other foods are referred to as either reduced-fat or fat-free foods. Fat free foods are generally defined as containing 0.5 grams or less of digestible fat in a 30 ounce serving. A digestible fat can be used as all or a portion of the flowable edible fat of the ingredient suspension to make a fat-free ingredient fortified snack food, so long as the level of addition of the digestible fat ingredient suspension does not contribute an amount of digestible fat which causes the total digestible fat in the food to exceed the 0.5 gram per serving limit.

Two rheological properties of the edible fat important to delivering a stable flowable suspension are the viscosity and Consistency. The viscosity relates to the capability of the edible fat to maintain the ingredient powder in a suspension that resists the settling by inertial and gravitational forces. The Consistency relates to the flowability of the material. The consistency relates to the flowability of the material and how well it will be absorbed into the food product after surface application. In general, the lower the consistency the better the absorption. However, consistency and viscosity trend directionally together such that improved flowability can come at the expense of the capability to suspend the ingredient. It is important to balance both these parameters to achieve a stable, flowable suspension.

A stable suspension can be achieved by using an edible fat with a viscosity of about 1–15 poise measured at a shear rate of 10 sec$^{-1}$ between 20–40° C., preferably 1.2–6 poise, and more preferably 2.5–5.5 poise. The desired viscosity can be obtained by using the edible fats in their original as-processed state or by shear thinning the material as herein after described.

In one embodiment, a stiffened, nonflowable nondigestible fat can be mixed or subjected to an amount of shear to physically change the crystal network of the material such that it becomes flowable. The material is used in its fully cooled, solidified state. Importantly, the nondigestible fat should display minimal post shear hardening that would impede flowability after processing. The desired flowability can be achieved by controlling the crystal morphological structure or level of solid fat. Preferred crystal structures are not beta-prime tending and resemble more alpha or beta type crystal states. The alpha or beta crystal states can be preferentially achieved by use of sucrose fatty acid esters. The nondigestible solid fat level used to minimize or avoid post hardening is 1–20%, preferably 3–15%, more preferably 4–10%, and most preferred 5–8%.

Shear can be applied to the edible oil by an impeller type agitator (e.g. Lightnin Mixer) or a swept wall mixer (e.g. Hobart, Hamilton, Bredda) or similar mechanical rotary mixing devices for between 5–15 minutes. The shear applied via this type of processing is 1000–4000 dynes/cm$^2$, preferably 1200–3600 dynes/cm$^2$, more preferably 1800–3000 dynes/cm$^2$. The sheared nondigestible fat has a Consistency of less than 600 P.sec$^{(n-1)}$, preferably less than 400 P.sec$^{(n-1)}$, more preferably less than 200 P.sec$^{(n-1)}$, and most preferably less than 100 P.sec$^{(n-1)}$ in a temperature range of 20–40° C. Surprisingly, the non-digestible fat does not have a yield point and reaches a stable rheology capable of supporting a stable suspension after sufficient shear mixing. The mixing can be done at temperatures up to about 10 to 15° C. (about 18 to 27° F.) less than the complete melt point of the non-digestible fat, preferably up to about 49° C. (about 120° F.) and most preferably at ambient temperature, for example at about 21° C. This type of process is suitable for manual or batch shear thinning of small quantities on the order of one drum (about 200 liters) of nondigestible fat per batch, and would not accommodate a continuous mass production facility.

Preferred for use with the present invention are flowable nondigestible oils which, though capable of being used in food products to provide effective passive oil loss control, are processed to be flowable at ambient storage conditions (temperatures of from 5° C. to about 40° C.), and therefore easy to process into the ingredient suspension. Such a flowable nondigestible oil composition generally has a Consistency of less than 600 P.sec$^{(n-1)}$ in a temperature range of from 20–40° C. The flowable nondigestible oil composition will have a Consistency of preferably less than about 400 P.sec$^{(n-1)}$, more preferably less than about 200 P.sec$^{(n-1)}$, and most preferably less than about 100 P.sec$^{(n-1)}$, in a temperature range of 20–40° C.

A preferred flowable nondigestible oil composition comprising a solid nondigestible oil component having a melting point above 37° C. can be processed by applying shear to the composition while crystallizing the solid nondigestible oil component. Such flowable nondigestible oil compositions and processes for making are described in USSN 08/844,590, filed Apr. 21, 1997, now abandoned which is WO 98/47909, published Oct. 29, 1998, and are herein referred to as fractionally crystallized flowable polyol polyesters. The solid nondigestible oil component comprises a saturated polyol fatty acid polyester, and preferably also a diversely esterified polyol polyester. The solid saturated polyol polyester is capable to crystallizing into spherulites from a liquid oil in which it is melted. The solid saturated polyol polyester of the present invention will comprise esters of essentially only, and preferably only, long chain saturated fatty acid radicals which are typically normal and contain at least 14, preferably 14 to 26, and more preferably 16 to 24, and most preferably from 20 to 24, carbon atoms. Particularly preferred are saturated fatty acid radicals of 22 carbon atoms. The long chained saturated radicals can be used in combination with each other in all proportions. Examples of suitable long chain saturated fatty acid radicals include tetradecanoate (myristate), hexadecanoate (palmitate), octadecanoate (stearate), eicosanoate (arachidate), docosanoate (behenate), tetracosanate (lignocerate), and hexacosanoate (cerotate).

The solid diversely esterified polyol polyester of the present invention comprises polyol polyesters which have their ester group-forming fatty acid radicals selected so that the polyol backbone does not contain all of a single type of ester group. Generally, these polyol polyesters contain two basic types of ester groups. These are (a) ester groups formed from long chain saturated fatty acid radicals, as herein above described, and (b) dissimilar ester groups formed from acid radicals which are "dissimilar" to the long chain saturated fatty acid radicals. When these "dissimilar" fatty acid and/or other organic acid radicals are esterified onto a polyol that contains or will contain long chain saturated fatty acid radicals, they will introduce diverse esterification into the resulting polyol polyester molecule, thereby altering the crystal structure as these molecules pack together during crystallization. This diverse esterification can be due to differences in length of the ester-forming acid radicals (e.g., short chain versus long chain), or other steric factors, e.g. branched chain versus straight chain, unsaturated chain versus saturated chain, aromatic chain versus aliphatic chain, etc. Polyol polyesters containing these "long chain" and "dissimilar" ester groups are therefore herein called "solid diversely esterified polyol polyesters".

The solid diversely esterified polyol polyesters tend to have "asymmetrical" or irregular molecular structures. It is believed that the asymmetrical structure of these molecules interfere with the normal packing tendency of the synunetrical solid saturated polyol polyester molecules during co-crystallization in the liquid polyol polyester. This interference blocks the usual unrestrained three dimensional growth of the solid saturated polyol polyester molecules and thus induces restrained three dimensional growth or otherwise induces growth in, at most two dimensions, e.g., the formation of relatively thin platelet-like particles.

The dissimilar ester groups are formed from acid radicals selected from long chain unsaturated fatty acid radical, short chain saturated fatty acid radical, and other dissimilar fatty acid radicals, and mixtures thereof. The preferred dissimilar acid radical is a long chain unsaturated fatty acid radical.

The long chain unsaturated fatty acid radicals are typically straight chain (i.e., normal) mono- and di-unsaturates, and contain at least about 12, preferably about 12 to about 26, more preferably about 18 to 22, and most preferably 18 carbon atoms. Examples of suitable long chain unsaturated fatty acid radicals for the solid polyol polyesters herein are lauroleate, myristoleate, palmitoleate, oleate, elaidate, erucate, linoleate, linolenate, arachidonate, eicosapentaenoate, and docosahexaenoate. For oxidative stability, the mono- and/or diunsaturated fatty acid radicals are preferred.

The short chain saturated fatty acid radicals are typically normal and contain 2 to 12, preferably 6 to 12 and most preferably 8 to 12, carbon atoms. Examples of suitable short chain saturated fatty acid radicals are acetate, butyrate, hexanoate (caproate), octanoate (caprylate), decanoate (caprate), and dodecanoate (laurate).

Other dissimilar ester-forming radicals can include fatty-fatty acid radicals having at least one hydroxyl group that is esterified with another fatty or other organic acid. Nonlimiting examples of suitable fatty-fatty acid radicals include 12-hydroxy-9-octadecenoic acid (ricinoleic acid), 12-hydroxy-octadecanoic acid, 9-hydroxy-octadecanoic acid, 9-hydroxy-10, 12-octadecadienoic acid, 9-hydroxyoctadecanoic, 9, 10-dihydroxyoctadecanoic acid, 12, 12-dihydroxyeicosanoic acid, and 18-hydroxy-9, 11, 13-octadecatrienoic acid (kamolenic acid). Ricinoleic acid is a preferred hydroxy-fatty acid. Castor oil is a convenient source of ricinoleic acid. Other sources of hydroxy-fatty acids include hydrogenated castor oil, strophanthus seed oils, calendula officinalis seed oils, hydrogenated strophanthus seed oils and hydrogenated calendula officinalis seed oils, cardarnine impatiens seed oils, kamala oils, mallotus discolor oils, and mallotus claoxyloides oils.

The fractionally crystallized flowable polyol polyester can also optionally contain other solid nondigestible particles which comprise polymerized polyesters, i.e., polyol polyester polymers. Such polyol polyester polymers can be added so long as they do not significantly interfere with the formation of the solid saturated polyol polyester spherulites. Polyol polyester polymers are those formed by polymerizing a polyol polyester monomer to provide a molecule having at least two separate esterified polyol moieties linked by covalent bonds between ester groups of these different polyol moieties. For example, two sucrose octabehenate monomers could be cross-linked between fatty acids to form a polymer. Repeating units of such polyol polyester polymers can be the same or different such that the generic term "polymer" in this context includes the specific term "copolymer". The number of repeating monomer (or co-monomer) units which make up such polyol polyester polymers can range from about 2 to 20, preferably from about 2 to 12. Depending on the method of preparing them, the polyol polyester polymers are frequently oligimers containing from 2 to 4 monomeric units, i.e., are dimers, trimers, or tetramers. The most typical type of polyol polyester polymer for use herein is dimer.

Liquid nondigestible oils have a complete melting point below about 37° C. include liquid polyol fatty acid polyesters (see Jandacek; U.S. Pat. No. 4,005,195; Issued Jan. 25, 1977); liquid esters of tricarballylic acids (see Hamrn; U.S. Pat. No. 4,508,746; Issued Apr. 2, 1985); liquid diesters of dicarboxylic acids such as derivatives of malonic and succinic acid (see Fulcher; U.S. Pat. No. 4,582,927; Issued Apr. 15, 1986); liquid triglycerides of alpha-branched chain carboxylic acids (see Whyte; U.S. Pat. No. 3,579,548; Issued May 18, 1971); liquid ethers and ether esters containing the neopentyl moiety (see Minich; U.S. Pat. No. 2,962,419; Issued Nov. 29, 1960); liquid fatty polyethers of polyglycerol (See Hunter et al; U.S. Pat. No. 3,932,532; Issued Jan. 13, 1976); liquid alkyl glycoside fatty acid polyesters (see Meyer et al; U.S. Pat. No. 4,840,815; Issued Jun. 20, 1989); liquid polyesters of two ether linked hydroxypolycarboxylic acids (e.g., citric or isocitric acid) (see Huhn et al; U.S. Pat. No. 4,888,195; Issued Dec. 19, 1988); various liquid esterified alkoxylated polyols including liquid esters of epoxide-extended polyols such as liquid esterified propoxylated glycerins (see White et al; U.S. Pat. No. 4,861,613; Issued Aug. 29, 1989); Cooper et al; U.S. Pat. No. 5,399,729; issued Mar. 21, 1995; Mazurek; U.S. Pat. No. 5,589,217; issued Dec. 31, 1996; and Mazurek; U.S. Pat. No. 5,597,605; issued Jan. 28, 1997); liquid esterified ethoxylated sugar and sugar alcohol esters (see Ennis et al; U.S. Pat. No. 5,077,073); liquid esterified ethoxylated alkyl glycosides (see Ennis et al; U.S. Pat. No. 5,059,443, issued Oct. 22, 1991); liquid esterified alkoxylated polysaccharides (see Cooper; U.S. Pat. No. 5,273,772; issued Dec. 28, 1993); liquid linked esterified alkoxylated polyols (see Ferenz; U.S. Pat. No. 5,427,815; issued Jun. 27, 1995 and Ferenz et al; U.S. Pat. No. 5,374,446; issued Dec. 20, 1994); liquid esterfied polyoxyalkylene block copolymers (see Cooper; U.S. Pat. No. 5,308,634; issued May 3, 1994); liquid esterified polyethers containing ring-opened oxolane units (see Cooper; U.S. Pat. No. 5,389,392; issued Feb. 14, 1995); liquid alkoxylated polyglycerol polyesters (see Harris; U.S. Pat. No. 5,399,371; issued Mar. 21, 1995); liquid partially esterified polysaccharides (see White; U.S. Pat. No. 4,959,466; issued Sep. 25, 1990); liquid polydimethyl siloxanes (e.g., Fluid Silicones available from Dow Corning). Solid nondigestible fats or other solid materials can be added to the liquid nondigestible oils to prevent passive oil loss. Particularly preferred nondigestible fat compositions include those described in U.S. Pat. No. 5,490,995 issued to Corrigan, 1996, U.S. Pat. No. 5,480,667 issued to Corrigan et al, 1996, U.S. Pat. No. 5,451,416 issued to Johnston et al, 1995 and U.S. Pat. No. 5,422,131 issued to Elsen et al, 1995. U.S. Pat. No. 5,419,925 issued to Seiden et al, 1995 describes mixtures of reduced calorie triglycerides and polyol polyesters that can be used herein. However the latter composition may provide more digestible fat.

The first step of a continuous process of making fractionally crystallized flowable polyol polyester comprises melting the solid polyol fatty acid polyesters in the liquid polyol polyester at a temperature above the temperature where substantially all of solid material of the solid polyol fatty acid polyester is melted into the liquid. Preferably, the composition is raised to a temperature at least 10° C. above the complete melt temperature of the solid polyol fatty acid polyester wherein all the solid polyol fatty acid polyester is melted. The process includes the next step of fractionally crystallizing solid saturated polyol polyester into spherulites, by reducing the temperature of a melted nondigestible oil composition to a first crystallization temperature less than the onset crystallization temperature of the solid saturated polyol polyester, and holding the nondigestible oil composition at the first crystallization temperature for a time sufficient to crystallize the solid saturated polyol polyester into crystallized spherulites. Furthermore, the first crystallization temperature should be selected such that crystallization of any solid diversely esterified polyol polyester is avoided, since such could disrupt the formation of the flow-efficient spherulites. Preferably the first crystallization temperature is at least about 1° C., more preferably at least 2° C., and most preferably at least 3° C., higher than the onset crystallization temperature of the solid diversely esterified polyol polyester.

The next step of the process comprises crystallizing any remaining portion of the solid polyol fatty acid polyester, specifically the diversely esterified polyol polyester, by reducing the temperature of the composition to a second crystallization temperature, and holding the composition at the second temperature for a time sufficient to crystallize the remaining portion of the solid polyol fatty acid polyester. In a preferred process, this step further comprises applying shear energy during the step of crystallizing.

Preferably crystallization of the solid diversely esterified polyol polyester, after crystallization of the solid saturated polyol polyester into large spherulites, will substantially avoid forming the large aggregate particles clustered together, which result in a less flowable nondigestible oil. One method of forming the flowable nondigestible oil involves crystallizing the portion of the solid diversely esterified polyol polyester onto the surfaces of the spherulites (formed from solid saturated polyol polyesters) which results in an aggregated spherulite comprising a spherulite particle core surrounded or coated substantially with aggregate particles of the solid diversely esterified polyol polyester. The size of the small aggregated spherulites (comprising a spherulite core with aggregate solid diversely esterified polyol polyester crystallized to its surface) as described herein are generally about I micron to about 50 microns. Preferably they are from about 1 micron to about 30 microns, and more preferably from about 1 micron to about 10 microns. This process generally involves reducing the second crystallization temperature slowly through the temperature range where the solid diversely esterified polyol polyester crystallizes, in order to likewise slow the rate of crystal formation of the solid diversely esterified polyol polyester.

An alternative method is to form crystallized aggregates of the diversely esterified polyol polyester in the liquid polyol polyester, which results when the cooling through the second crystallization temperature occurs more rapidly. By applying mechanical shear to the composition during the crystallization, the small aggregate particles and platelets are prevented from clustering together into larger aggregate particles. The shear energy also can result in tearing or breaking apart of larger aggregate particles into the smaller aggregate particles. In addition, the shear energy is theorized to compress the crystal structures of the smaller aggregate particles such that their dimensions and porosity are reduced. The cooling rate is typically more than about 3° C./min., and can be up to about 80° C./min. Preferably the rate of cooling is accompanied by moderate to high shear agitation. A scraped wall heat exchanger is a preferred apparatus for rapidly reducing the temperature of the composition, at rates typically of about 8–80° C./min.

In an alternative embodiment, a flowable nondigestible fat comprising a solid nondigestible oil component having a melting point above 37° C., the solid nondigestible oil component comprising a fully saturated polyol polyester (known as hardstock polyol polyester), can be made by fractionally crystallizing the hardstock polyol polyester into well defined spherulites of a diameter from about 3 microns to about 50 microns. Such flowable nondigestible oil compositions and processes for making are described in PCT Patent Application No. PCT/US98/10325, filed May 20, 1998, now WO 98/52428, Nov. 26, 1998 and herein referred to as shear crystallized flowable polyol polyester. The solid nondigestible oil component comprises a saturated polyol fatty acid polyester, and preferably also a diversely esterified polyol polyester, as described above for the fractionally crystallized flowable polyol polyester. The first step of the process of making shear crystallized flowable polyol polyester comprises melting the solid polyol fatty acid polyesters in the liquid polyol polyester at a temperature above the temperature where substantially all of solid material of the solid polyol fatty acid polyester is melted into the liquid. Preferably, the composition is raised to a temperature at least 10° C. above the complete melt temperature of the solid polyol fatty acid polyester when all the solid polyol fatty acid polyester is melted. The next step of the process comprises rapidly crystallizing at least a substantial portion of the solid polyol fatty acid polyester, defined as at least more than 50% by weight, and preferably more than 80%, more preferably more than 95%, and most preferably more than 99%, by reducing the temperature of the molten polyol polyester composition to a crystallization temperature of the solid polyol fatty acid polyester, and holding the polyol polyester composition at the crystallization temperature for a time sufficient to crystallize the solid polyol fatty acid polyester. The crystallization temperature is preferably within a crystallization temperature range of from about the onset crystallization temperature of the solid polyol fatty acid polyester, down to about 25° C. Most preferably, the crystallization temperature of the solid polyol fatty acid polyester is within the temperature range of the storage conditions for the flowable nondigestible oil, typically about 25° C. to about 40° C., though more preferably about 25° C. to about 30° C. The step of rapidly crystallizing the substantial portion of the solid polyol fatty acid polyester typically is completed in less than about 30 minutes, preferably in less than about 5 minutes, and more preferably in less than about 30 seconds, and most preferably in less than about 15 seconds.

The process also comprises the step of shearing during the step of crystallizing the solid polyol fatty acid polyester at the crystallization temperature. By applying shear to the composition during the crystallization, the solid polyol fatty acid polyester is encouraged to crystallize into discrete crystals and unaggregated crystal platelets. By shearing while the crystallization is occurrning, the resulting discrete and unaggregated crystals can be inhibited from growing to a size that might be large enough to separate from the liquid phase. It is also believed that the small crystal platelets may aggregate into small aggregate particles, but that the shearing inhibits the small aggregate particles from further clustering into larger aggregate particles which can begin to stiffen the composition. During the crystallizing step, shear is imparted to the polyol polyester composition at from about 400 $sec^{-1}$ to about 8000 $sec^{-1}$, more preferably at from about 500 $sec^{-1}$ to about 6000 $sec^{-1}$.

The crystallizing step can be conducted in such equipment as a swept-wall, scraped-wall, or screw-type heat exchanger or equivalent, scraped wall agitated reactors, plate and frame heat exchangers, and tube and shell heat exchangers. Such equipment in general cools the composition at a rate of from about 0.4° C./min. to 300° C./min., more preferably from about 0.8° C./min. to about 150° C./min. Examples of such heat exchangers include Cherry Burrell Votator, Girdler "A" units, a Sollich Turbo Temperer, and a Groen Model #DR(C) used for margarine and shortening manufacture, and Aasted chocolate tempering units. A preferred unit is the Votator unit which consists of a steel shaft rotating in a tube which is cooled externally by a coolant. The rotating shaft is fitted with scraper blades which press against the cool inner surface at high rotation speeds, continuously scraping the crystallizing composition from the inner surface of the tube. References to these conventional units include: Greenwell, B. A., J. Amer. Oil Chem. Soc., March 1981, pp. 206–7; Haighton, A. J., J. Amer. Oil Chem. Soc., 1976, Vol. 53, pp. 397–9; Wiedernann, L. H. J. Amer. Oil Chem. Soc., Vol. 55, pp. 826–7; Beckett, S. T., editor, Industrial Chocolate Manufacture and Use, Van Nostrand Reinhold, New York, 1988, pp. 185–9. All of these publications are incorporated herein by reference.

A scraped wall heat exchanger is a preferred apparatus for rapidly reducing the temperature and crystallizing the composition under high shear, typically at temperature reduction rates of about 8–300° C./min., and preferably about 100–300° C./min. The temperature of the coolant used for this crystallizing step in this equipment is sufficiently low to quickly cool the polyol polyester composition, but not so low so as to cause a significant amount of plating out of the polyol polyester onto the chilled surfaces of the apparatus. Typically the coolant temperature is in the range of from about −23° C. to about 20° C., more preferably in the range of from about −6.7° C. to about 7° C. Typical coolants include liquid ammonia, brine, and other refrigerants.

Following the step of rapidly crystallizing and shearing the polyol polyester composition to form the discrete and unaggregated crystal particles, it is preferred to continue shearing the crystallized composition at the crystallization temperature for a time sufficient for crystallization of the solid polyol fatty acid polyester to come substantially to completion, and to allow the solid polyol fatty acid polyester to complete crystallization to the discrete and unaggregated crystal particles. The continued shearing step serves to disrupt the formation of larger aggregate particles and any three-dimensional crystalline matrix that otherwise can form from the larger aggregate particles in the absence of the shearing. Such continued shearing preferably avoids creating any dead zones in the mixing vessel which might result in a localized stiffened composition. Typically the continued shearing is done for at least about 5 minutes, and more preferably for at least about 10 minutes. Generally no more than about 1 hour, preferably no more than about 30 minutes, is required for the continued shearing step. Less shear is needed in comparison with that used during the crystallization step; generally the shear rates range from about 10 $sec^{-1}$ to about 8000 $sec^{-1}$. Preferred types of apparatus for carrying out the continued shearing step include any agitated, jacketed vessel capable of being operated such that preferably air can be excluded from incorporation into the polyol polyester composition, and the temperature of the composition can be suitably controlled. An example of a suitable scraped-wall, jacketed, open tank mixer is a Krueter temper kettle (Beckett, pp. 183–4). In addition, it is possible to carry out the conditioning step in two or more separate pieces of agitated, heat exchanger equipment. Another mechanical devices that can be used for the continued shearing of the crystallized polyol polyester is a Ross 410 X-3 or a Readco twin screw mixer.

The continued shearing step can also be accomplished using non-mechanical mixing devices such as static mixers, consisting of a pipe section having a plurality of mixing elements contained in a series therein. Turbulence and shear are imparted to the product as it passes through stationary mixing blades within the pipe. Manufacturers of in-line static mixer include Komax and Lightnin.

Other ingredients known in the art can also be added to the nondigestible fat, including antioxidants such as TBHQ, and chelating agents such as citric acid.

Digestible fats can be used as the edible oil suspension agent, in partial or full replacement to the nondigestible fats provided there is sufficient rheology to provide particle suspension while also maintaining flowability. This has the disadvantage of adding caloric density to the composition, but can provide the capability to further tailor the suspension rheology. Suitable digestible fats include triglyceride oils refined or partially hydrogenated, fully hardened triglycerides, interesterified triglyceride fats, mono and diglycerides, acetylated monoglycerides, fat based emulsifiers, partially digestible medium chain triglycerides or trans-esterified medium chain triglycerides blended to achieve the desired rheology. Digestible fats for this application have a Consistency of less than 600 $P.sec^{(n-1)}$, preferably less than 400 $P.sec^{(n-1)}$, more preferably less than 200 $P.sec^{(n-1)}$, and most preferably less than 100 $P.sec^{(n-1)}$ in a temperature range of 20–40° C. The iodine value of the digestible fat would typically be between 85 to 115 with a solid fat content of 2% to 12% at a temperature of 21.1° C., preferably an iodine value of 90 to 115 and a solid fat content of 3% to 10%, and more preferably an iodine value of 100 to 115 with a solid fat content of 3% to 6%. A particularly preferred digestible fat composition if partially hydrogenated corn oil with an iodine value of 113±3, and a solid fat content of 2.9±0.8% at 26.7° C.

The crystal morphology of the digestible fat can affect the amount of post shear hardening. To minimize any change in Consistency it is desirable to control the level of beta-prime tending crystals which can be accomplished by limiting the combined level of C16 and C18 fatty acid chains to less than 13% of the total weight of the digestible lipid and preferably less than 10% by weight. An alternate approach would be to use small levels of acetylated monoglyceride in the blend to seed alpha forming crystal structures.

C. The Ingredients

The shear thinned edible oil can be a carrier within the ingredient suspension for a wide variety of food ingredients. Example ingredients include oil soluble flavors in powdered or liquid form, water soluble flavors in powdered or emulsion form, minerals, nutrients such as calcium, colorants, aromas, caffeine, and trigeminal nerve stimulants such as capsaicin. The ingredients can be solid and powdered, gelled or semi-solid, liquid, or a combination of the above. Generally a liquid or semi-solid ingredient will be immiscible in the edible oil, such that an emulsion or suspension can be formed. Oil-soluble ingredients can also be used, in which case the ingredients are miscible or soluble in the edible.

a) Flavors. Flavor Enhancers, and Aromas

Flavors can include solid or liquid form, oil or water soluble. Liquid water soluble flavors can be added at low levels or first emulsified with the edible fat via a moderate amount of shear mixing or addition of a surfactant. A useful embodiment of the present invention for water soluble flavors is the avoidance of plating with other carriers like salt which can alter the flavor display or spray drying into a powder which can damage flavors in process. Another usefuil embodiment is the uniform application of flavor particulates whereby the flavor particulates are adhered and distributed across the product surface.

Natural or synthetic flavors can be used. The preferred flavors are natural spices, herbs, and seeds or synthetic flavors derived from or designed to imitate these flavors. Example flavors can include potato type flavors such as pyrazines, browning flavors such a furfanols, tomato based components, and fruit flavors. Particularly preferred flavors can include, but are not limited to, garlic, onion, maijoram, rosemary, basil, tarragon, thyme, oregano, chili powder, curry powder, allspice, anise see, ginger, sage, mustard nutmeg, dill weed, celery salt, dill, mint, paprika, savory, cinnamon, and mixtures thereof. Other flavors, typically used on savory snacks, for example, barbecue, sour cream, cheese, cream cheese, taco flavor, pizza flavor, nacho cheese, ranch, green onion, and mixtures thereof. Citrus flavors such as lemon or orange are also preferred. The flavors contain volatile oils, which can be released upon heating.

While a preferred flavor is oil soluble and in a liquid form to minimize processing steps, a powdered form of the flavoring component can be used also. If the flavoring component is in the form of a powder, it is preferred that the flavoring component be dispersed or dissolved in some oil prior to mixing with the edible oil or non-digestible fat.

The flavoring component is added in an amount capable of imparting a desired flavor to the food product to which the ingredient suspension is added. The amount can be adjusted if mild or strong flavored oil is desired. The amount of flavoring component added may be as low as 0.01% or as high as 1.0% based on the finished food product weight. The level is dependent upon many variables, for example, intensity of flavored desired, type of flavoring component used, type of oil being flavored, etc. Preferably a level of from about 0.1% to about 0.5% of the flavor component is used to impart a desired flavor, more preferably, from about 0.15 to about 0.25% of the flavor component is used. The amount of flavoring component effective to flavor the oil can easily be determined by one skilled in the art.

Flavor enhancers can be added with greater control, less variability, and at low levels. For example, low levels of propylene glycol can be used to enhance flavors. Incorporation of flavor enhancers in the ingredient suspension avoids metering difficulties which typically will cause higher levels than desired to be added to the food product, and which can potentiate undesirable flavor reactions. Other flavor enhancer ingredients include citric acid, malic acid, or ascorbic acid which can often cause unbalanced flavor display due to particle size segregation which would be eliminated with the present invention.

b) Vegetables

Vegetable components can be added for flavor, appearance or nutritional benefit. Examples would include parsley, onion, garlic, paprika, carrot, and pepper. Larger particle sizes of 1000 microns or greater can be used to improve visual display and sensory experience during eating by providing more flavor mass.

c) Minerals/Nutrients

Ingredients such as calcium, folic acid, niacin, pantothenic acid, magnesium, manganese, phosphorous, iron, and selenium can be added.

d) Dietary Fibers

Fibers including carboxy methylcelluose, cereal grain fiber such as wheat, oat, bran etc.

e) Colorants

Non-limiting examples of colorants include all F&DC colorants, carotenoids such as beta-carotene, and apo carotenal.

f) Optional Vitamins

Optional ingredients include vitamins. The fat soluble vitamins A, D, E and K are liquids. Vitamin E acetate is stable under frying conditions and can be added directly to the nondigestible fat used to make the snack or used to fry the snack. The liquid forms of the vitamins are less bioavailable due to their solubility and partitioning in the nondigestible fat. Powdered or encapsulated vitamins are much less soluble providing the needed bioavailability. The difficulties of maintaining a uniform dispersion and the potential for oxidative/thermal degradation of some vitamins makes the application of powdered vitamin in frying oils impractical. The viscosity of nondigestible fats at frying temperatures will not suspend the vitamin powder particles. These liquid vitamins can be blended together or separately formed into a powdered product.

The powdered product is prepared by blending the vitamin with a dry carrier such as starch, sugar, gums, dextrin, gelatin or cellulose. The vitamin can also be encapsulated in a gel matrix, e.g. gum acacia and sugar, dextrin, gelatin, or other gums. Any conventional encapsulation technique and carrier can be used. See U.S. Pat. No. 4,486,435 and U.S. Pat. No. 5,290,567 for disclosure of encapsulated vitamins.

Water soluble vitamins in a powdered or stable emulsion form can also be added.

Examples of the solid vitamins that can be used in the present invention include A, B, C, D, E, and K.

Vitamins in liquid form can also be part of the mixture. Preferably these vitamins are readily bioavailable in the presence of nondigestible fats and are shelf stable. Mixed tocopherols and tocopherol acetate from natural or synthetic sources can be added as liquids.

D. The Ingredient Suspension

Food-additive ingredients are homogeneously blended with the flowable edible fat to form a stable ingredient suspension. Typically, such flowable edible oil composition will have a Consistency of about 600 or less, preferably less than about 400, and more preferably less than about 200, and most preferably less than 100.

The ingredients are added to the flowable digestible, nondigestible, or edible fat and mixed until a suspension is formed. A preferred process is a batch making process for making the suspension, since the equipment is simple and inexpensive, and can ensure excellent control of the level of ingredients in the suspension. This fat composition can generally be heated to about 10 to 15° C. (about 18 to 27° F.) less than the complete melt point of the non-digestible fat, preferably up to about 49° C. (about 120° F.) and most preferably at ambient temperature, for example at about 21° C., without causing significant ingredient degradation or disruption of the suspension. This heating lowers the viscosity of the edible fat and improves the pumpability and flowability of the ingredient suspension. Preferably, the suspension is maintained at ambient temperature, such as 21° C. Once the ingredient suspension is formed, it is preferred to apply agitation or mixing sufficient to maintain the ingredient in suspension. The ingredient suspension can be held in storage tanks, preferably with an inert gas blanket, until used.

The ratio of ingredient powder or encapsulated ingredients to flowable digestible, nondigestible, or edible fat can be varied, as well as can be the delivery temperature and pumping rate. These will be tied to food product production line speed to insure the correct level of ingredient suspension addition. To maintain flowability, the level of ingredient powder is less than 50%, more preferably less than 30%, and most preferably less than 20%. Particle size of the ingredient powder can also be varied with the maximum size governed by the inner diameter of the application apparatus with possible particle diameters of 1000 microns or greater, though preferably the ingredient powder will have about the same particle size as any salt or flavorings normally added to the food product, so that the food product will have a uniform surface of appearance and consistency. The final Consistency of the suspension is less than 4000, more preferably less than 3000, and most preferably less than 2000.

E. The Food Product

The ingredient suspension can be readily applied for accurate and precise metering to a wide variety of continuously processed food products including fried or baked snack foods, baked goods such as cookies, breads, crackers, pretzels, bars, muffins, pie doughs or roasted nuts, coated nuts or popcorn or food service products like french fries, chicken, fish, meats. A preferred food product is a fabricated snack food, preferably in the form of a snack chip. Preferred fabricated snack chips include potato and corn chips. Such fabricated potato or corn snack chips. Any form or shape of a snack food or other food product can be used with the present invention, and any such food products can be fried, baked or otherwise cooked.

In a preferred embodiment, the vitamin suspension is applied to a preferred fabricated snack food, the process comprises the steps of:

(a) forming a sheetable dough comprising from about 50% to about 70% of a starch-based material comprising:
  i) at least about 3.2% modified starch comprising at least about 3% hydrolyzed starches having a D.E. value of from about 5 to about 30, and wherein any dried modified starches present have a WAI of from about 0.4 to about 8 grams of water per gram of modified starch;
  ii) up to about 96.8% potato flakes having a WAI of from about 6.7 to about 9.5 grams of water per gram of starch;
  iii) provided that if any other starch-containing ingredient is present in the starch-based material other than potato flakes, the other starch-containing ingre-
    dient has a WAI below that of the potato flakes; and
  iv) from about 30% to about 50% added water.
(b) forming the dough into a sheet;
(c) cutting snack pieces from the sheet;
(d) frying said snack pieces in a nondigestible fat; and
(e) applying a controlled amount of the vitamin suspension to the hot snack pieces.

The snack pieces are fried at a temperature sufficient to form a snack product having a light, crispy, crunchy texture, improved flavor and a nondigestible fat content of from about 20% to about 38%, preferably from about 30% to about 36%, and a moisture content of less than 5%, and are fortified with the vitamins.

Optionally, the dough compositions can include from about 0.5% to about 6% of an emulsifier.

a) Starch-based Materials

An important component in the dough compositions of the present invention are the starch-based materials. The doughs of the present invention can comprise from about 50% to about 70%, preferably from about 55% to about 65%, and more preferably about 60% of a starch-based material. The starch-based material can comprise from about 25 to 100% potato flakes with the balance (i.e., from 0 to about 75%) being other starch-containing ingredients such as potato flour, potato granules, corn flour, masa corn flour, corn grits, corn meal, rice flour, tapioca, buckwheat flour, rice flour, oat flour, bean flour, barley flour, tapioca, as well as modified starches, native starches, and dehydrated starches, starches derived from tubers, legumes and grain, for example cornstarch, wheat starch, rice starch, waxy corn starch, oat starch, cavassa starch, waxy barley, waxy rice starch, glutinous rice starch, sweet rice starch, amioca, potato starch, tapioca starch, oat starch, cassava starch, and mixtures thereof. The starch-based material preferably comprises from about 40% to about 90%, more preferably from about 50% to about 80%, and even more preferably about 60% to about 70%, potato flakes and from about 10% to about 60%, preferably from about 20% to about 50%, and more preferably from about 30% to about 40%, of these other starch-containing ingredients.

Particularly preferred starch-based materials of the present invention are made from dehydrated potato flakes and potato granules wherein the potato flakes comprise from about 25% to about 95%, preferably from about 35% to about 90%, and more preferably from about 45% to about 80% of the starch-based material, and the potato granules comprise from about 5% to about 75%, preferably from about 10% to about 65%, and more preferably from about 20% to about 55%, of the starch-based material.

Another preferred embodiment can be made using a mixture of potato flakes and potato granules, combined with other starch-containing ingredients that are not potato flakes or granules. Typically, the combined flakes and granules comprise from about 40% to about 90%, preferably from about 50% to about 80%, and more preferably from about 60% to about 70% of the starch-based material, while the other non-potato flake/granule starch-containing ingredients comprise from about 10% to about 70%, preferably from about 20% to about 50%, and more preferably from about 30% to about 40%, of the starch-based materials.

Particularly preferred potato flakes comprise from about 40% to about 60% broken cells, from about 16% to about 27% amylose, from about 5% to about 10% moisture, and at least about 0.1% emulsifier. Additionally, the dehydrated flakes of the present invention have a WAI of from about 6.7 to about 9.5 grams of water per gram of flakes, a hot paste viscosity of from about 100 Brabender Units (BU) to about 320 BU and a cold paste viscosity of from about 100 BU to about 200 BU. From about 40% to about 60% of the dehydrated potato flakes remain on a #40 U.S. screen.

The potato flakes can be prepared by steam peeling raw potatoes and slicing the peeled potatoes to a thickness of from about 0.25 to about 0.75 inches, preferably from about 0.3 to about 0.7 inches and more preferably from about 0.35 to about 0.65 inches (hereinafter referred to as "slabs").

Next the raw potato slabs are cooked under atmospheric pressure using steam typically having a pressure of about 2 to about 20 psig (pounds per square inch gauge). The temperature of the potato slabs rise from about 175° F. (79° C.) to about 212° F. (100° C.) during the first one-third of the cooking cycle, with the temperature remaining at about 212° F. (100° C.) during the remainder of the cooking cycle. The temperature rise from about 175° F. (79° C.) to about 212° F. (100° C.) preferably occurs over a time period of more than about 10 minutes with the total cooking time being at least about 30 minutes. After steam cooking, the potato slabs are riced, dehydrated and comminuted by known methods.

In order to obtain the desired organoleptical properties in the snack product (i.e., crispness, decreased waxiness impression and increased mouthmelt), it is important that the starch-based material comprise at least about 3.2% of a modified starch comprising at least about 3% hydrolyzed starches having a DE of from about 5 to about 30, and wherein any dried modified starches present have a WAI of from about 0.4 to about 8 grams of water per gram of modified starch. It is also important that any potato flakes in the starch-based materials have a WAI of from about 6.7 to about 9.5 grams, preferably from about 7.0 to about 9.0, and more preferably from about 7.7 to about 8.3, grams of water per gram of starch and that any other starch-containing ingredients have a WAI lower than the potato flakes.

The starch-based materials preferably comprise a high amylopectin flour or starch (~ at least about 40% amylopectin) selected from the group consisting of waxy corn, waxy barley, waxy rice, glutinous rice, sweet rice, and mixtures thereof. When a high amylopectin flour or starch is used it is preferably present at a level of from about 1% to about 15%, preferably from about 2% to about 10%, and more preferably from about 3% to about 6%, by weight of the starch-based materials.

In order to obtain the desired organoleptical properties of the snack and sheetability of the doughs of the present invention, it is important that the high amylopectin flour have a WAI lower than the flakes or granules used to make the dough composition. Preferred high amylopectin flours are selected from the group consisting of sweet rice flour, waxy rice flour and waxy corn flour. Particularly preferred high amylopectin starches are available from National Starch and Chemical Corporation, Bridgewater, N.J. and is sold under the trades name of Cereal Crisp™, Amioca™ and Hylon V™ (50% amylose) and Hylon VII™ (70% amylose).

b) Modified Starch

An essential ingredient in the dough compositions of the present invention is modified starch. (When calculating the level of modified starch according to the present invention, modified starch (e.g., gelatinized starch) that is inherent in potato flakes or granules and flours is not included.)

At least about 0.2% modified starch selected from the group consisting of pregelatinized starches, cross-linked starches, acid modified starches, and mixtures thereof are needed to increase the crispness of the chip. Preferably, a level of from about 0.2% to about 10%, more preferably from about 1% to about 7%, and even more preferably from about 3% to about 5%, modified starch is used. Particularly preferred modified starches are available from National Starch and Chemical Corporation, Bridgewater, N.J. and are sold under the trade names of N-Lite™ (pregelatinized-crosslinked starch, Ultrasperse-A™(pregelatinized, waxy corn), N-Creamer™ 46 and Corn PCPF400™. This material is a partially pre-cooked corn meal.

Hydrolyzed starch is also needed in the dough compositions of the present invention. Hydrolyzed starch is important to the processability of the doughs of the present invention which have relatively low water levels. In the absence of hydrolyzed starches, low moisture levels in the dough can prevent formation of a continuous, smooth extensible dough sheet, can hinder subsequent expansion of the dough pieces during frying and can also affect the elasticity of the dough. Although the dough compositions can be sheeted without the inclusion of hydrolyzed starches, the resulting snack product is high in fat and has an undesirable hard, brittle and foamy texture.

Hydrolyzed starches can be included in the dough compositions in an amount of at least about 3%, with a usual range of from about 3% to about 15%. Preferably, hydrolyzed starches are included in an amount of from about 5% to about 12%. Suitable hydrolyzed starches for inclusion in the dough include maltodextrins and corn syrup solids. The hydrolyzed starches for inclusion in the dough have Dextrose Equivalent (D.E.) values of from about 5 to about 30, preferably from about 10 to about 20. Maltrin™ M050, M100, M150, M180, M200, and M250 (available from Grain Processing Corporation, Iowa) are preferred maltodextrins. The D.E. value is a measure of the reducing equivalence of the hydrolyzed starch referenced to dextrose and is expressed as a percentage (on a dry basis). The higher the D.E. value, the higher the dextrose equivalence of the starch.

c) Water

The dough compositions of the present invention comprise from about 30% to about 50%% added water, preferably from about 22% to about 40%, and more preferably from about 24% to about 35%, added water. The level of water in flours and starches is usually from about 3% to about 8%. However, if the maltodextrin or corn syrup solids are added as a solution or syrup, the water in this syrup or solution is included as "added water". The amount of added water includes any water used to dissolve or disperse ingredients and includes water present in corn syrups, etc.

d) Emulsifiers

An ingredient that can be added optionally to the dough compositions to aid in the processability of the dough is an emulsifier. The emulsifier works via several mechanisms. The first is as a coating of the flour in the mixer just prior to the addition of the water. This limits the moisture absorption of the flour producing a "short" dough. The second function of the emulsifier is to create a dispersion of fat and moisture droplets throughout the dough. Both of these mechanism tend to limit the adhesiveness of the starch contained in the flour, preventing permanent adhesion to the sheeting rolls.

An emulsifier is preferably added to the dough composition prior to sheeting the dough. The emulsifier can be dissolved in a fat or in a polyol fatty acid polyester, preferably a sucrose fatty acid polyester such as Olean™, available from The Procter and Gamble Company. Suitable emulsifiers include mono- and diglycerides, diacetyl tartaric acid esters and propylene glycol mono- and diesters and polyglycerol. Polyglycerol emulsifiers such as monoesters of polyglycerols, preferably hexapolyglycerols can be used.

Particularly preferred emulsifiers comprise a blend of from about 42.5% to about 90%, preferably from about 50% to about 85%, more preferably from about 60% to about 80%, non-digestible fat with the balance being a mixture of diglyceride, triglyceride, and preferably a monoglyceride wherein the level of monoglyceride is at least about 30%, and is typically from about 30% to about 95%, preferably from about 50% to about 90% wherein the monglyceride has an IV of greater than about 60, preferably an IV between about 70 to about 120, more preferably an IV of from about 80 to about 110, even more preferably an IV of from about 90 to about 100.

Preferably, the mono-glyceride is a distilled monoglyceride having an IV of about 60, derived from, for example, soybean oil, rapeseed oil, cottonseed oil, sunflower seed oil, palm oil, palm olein, safflower oil, corn oil, peanut oil and mixtures thereof. The preferred distilled monoglycerides include but are not limited to monoglycerides derived from soybean oil, rapeseed and palm oil and mixtures thereof.

Typically commercially available mono-glycerides contain varying amounts of di- and tri-glycerides. For example, distilled monodiglyceride comprise about 90% monoglyceride while monodiglycerides comprise about 30% monoglycerides. Either can be used in the dough formulations of the present invention.

The level of emulsifier depends on the amount of work input that the dough will receive in subsequent processing (e.g., extrusion, sheeting) steps. As used herein, the term "emulsifier" refers to an emulsifier which has been added to the dry dough ingredients. Emulsifiers which are inherently present in the dry dough ingredients, such as in the case of the potato flakes, are not included in the term added emulsifier.

Particularly preferred monoglycerides are sold under the trade names of Dimodan™ available from Danisco, New Century, Kans. and DMG 70, available from Archer Daniels Midland Company, Decatur, Ill.

The need for higher levels of emulsifier increases as work input increases. Typically, if the doughs are to be sheeted, emulsifiers are added to the dough in an amount of from about 0.5% to about 6% by weight, preferably from about 1.0% to about 5%, more preferably from about 2% to about 4% and more preferably about 3%.

A preferred process and apparatus for preparing fabricated chip-type fried products is disclosed in U.S. Pat. No. 3,626,466, issued to Liepa on Dec. 7, 1971, the disclosure of which is incorporated by reference. The equipment system is used to make fabricated chips by frying dough pieces in dovals or as constrained dough pieces. The dough pieces are cut from. a continuous dough roll and placed between two mated, perforated mold halves. The surfaces of the mold halves can be any desired shape, though preferred is a saddle shape which provides the ship with a uniform shape that can be packaged in a compact manner. The apertures of the perforated mold halves are preferably uniformly distributed over the surface of the mold halves to permit the heated frying medium (preferably a heated nondigestible oil) to come into intimate contact with the surfaces of the dough sections which are positioned there between and thereby fly the same to a uniform color and texture. In terms of size, apertures having a diameter of greater than about 1 centimeter are undesirable because water dispersed within the dough can vaporize into steam during frying to form surface bubbles thereon as a result of which the dough can expand through the apertures and result in difficulty when the dried chip is to be removed from the molds. Preferred are stainless steels molds having a thickness of about 0.80 millimeters, and having circular apertures of about 1.6 millimeters in diameter with the centers spaced uniformly from one another by about 4.75 millimeters in a staggered pattern.

The mold halves with the dough piece there between is passed through a fryer, which is a reservoir having a suitable heated fat or frying medium therein such as edible oil, shortening, or the like, and preferably a nondigestible oil. The mold halves are positioned so that the dough piece is immersed in the frying medium. When the dough sections have been fried, they are carried from the frying medium by the mold halves and deposited onto a finished chip delivery belt in one or a plurality of substantially straight rows of fried chips.

A preferred process and apparatus for preparing fabricated chip-type fried products is disclosed in U.S. Pat. No. 3,626,466, issued to Liepa on Dec. 7, 1971, the disclosure of which is incorporated by reference. The equipment system is used to make fabricated chips by frying dough pieces in dovals or as constrained dough pieces. The dough pieces are cut from a continuous dough roll and placed between two mated, perforated mold halves. The surfaces of the mold halves can be any desired shape, though preferred is a saddle shape which provides the ship with a uniform shape that can be packaged in a compact manner. The apertures of the perforated mold halves are preferably uniformly distributed over the surface of the mold halves to permit the heated frying medium (preferably a heated nondigestible oil) to come into intimate contact with the surfaces of the dough sections which are positioned there between and thereby fry the same to a uniform color and texture. In terms of size, apertures having a diameter of greater than about 1 centimeter are undesirable because water dispersed within the dough can vaporize into steam during frying to form surface bubbles thereon as a result of which the dough can expand through the apertures and result in difficulty when the dried chip is to be removed from the molds. Preferred are stainless steels molds having a thickness of about 0.80 millimeters, and having circular apertures of about 1.6 millimeters in diameter with the centers spaced uniformly from one another by about 4.75 millimeters in a staggered pattern.

The mold halves with the dough piece there between is passed through a fryer, which is a reservoir having a suitable heated fat or frying medium therein such as edible oil, shortening, or the like, and preferably a nondigestible oil. The mold halves are positioned so that the dough piece is immersed in the frying medium. When the dough sections have been fried, they are carried from the frying medium by the mold halves and deposited onto a finished chip delivery belt in one or a plurality of substantially straight rows of fried chips.

F. Application of Ingredient Suspension to the Food Product

Figure 1:
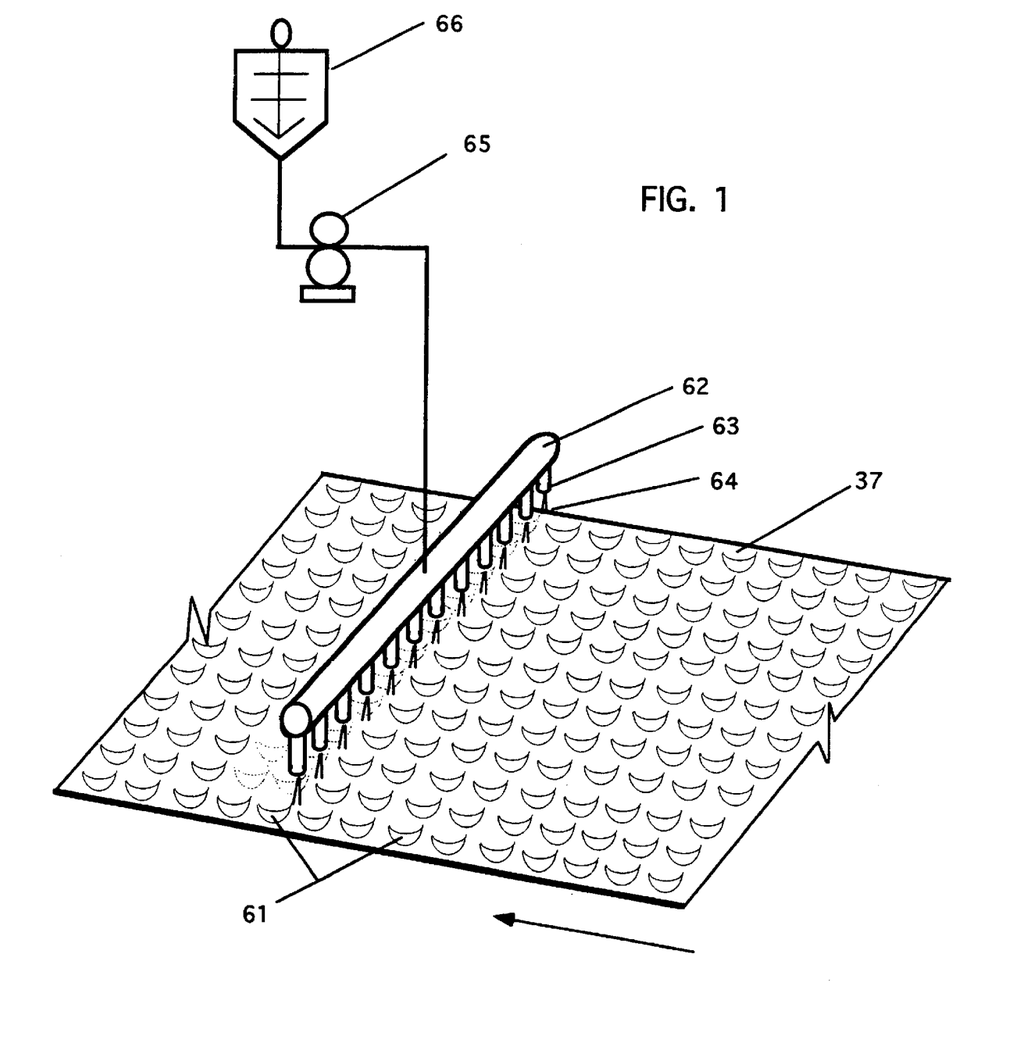
FIG. 1 represents an equipment system used to apply the ingredient suspension to a snack chip or other food, consisting of a tank, pump and piping to deliver streams of the ingredient suspension to rows of fabricated snack food.

FIG. 1 shows a ingredient suspension addition station 60. The finished chip delivery belt carries the chips 61 to the ingredient suspension addition station 60 where the ingredient suspension is added onto the food product stream. The ingredient suspension is transferred to a feed tank 66 where it is conveyed by a pump 65 to a manifold 62 which is fitted with a plurality of nozzles 63 through which the ingredient suspension is dispensed as a ingredient suspension stream 64. The nozzle 63 can be a conventional nozzle through which the suspension is sprayed or streamed, or it can be a open-ended tube through which the suspension is dribbled. The tube size or size and shape of the nozzles will depend on the food product being treated and the required application rate of the ingredient suspension, as one skilled in the art, without undue experimentation, can determine. Generally, a conventional oil sprayer can be used that can accommodate the viscosity of this suspension. A plurality of nozzles 63 are positioned each above a corresponding row of hot chips 61 passing thereunder on the conveying belt 3, and deliver the streams 64 of ingredient suspension onto the surfaces of the chips 61.

In a preferred equipment system, each nozzle above each row of chips 61 comprises its own feed pump 65 and its own piping system, with each feed pump sourcing out of a feed tank 66. This piping arrangement permits each stream of ingredient suspension to be individually, precisely controlled via its individual pump or other metering device. Optionally, the inlet to each pump can be fed from a header supplied by a separately pumped recirculation from the feed tank to further minimize flow variability.

An alternate application equipment system is to pump the ingredient suspension over a rotating bed of product being turned by a tumble drum. The nozzle design can be singular or multiple application points to optimize contacting with the product. A variation of this concept is to apply the ingredient suspension to a moving bed of product conveyed on a transfer belt.

The rate of application of the ingredient suspension is dependent on the concentration of the ingredients in the suspension and the desired level of ingredient fortification. The concentration of the ingredient suspension is determined based on the desired amount of digestible or nondigestible fat in the product that is to be contributed by the ingredient suspension stream, and on the desired level of ingredients required to be added to meet the Food Additive Petition requirements, and to compensate for any absorption of fat soluble ingredients caused by the nondigestible fat.

Typically, edible fat can be absorbed into the foods leaving the powdered or encapsulated ingredients adhering to the surface of the food. In some cases, for example when the ingredient suspension is applied to food substrates having low temperature (e.g., below about 60° C., such as about 35° C.) the edible fat will not be absorbed but will form a thin coating on the surface of the food which may be aesthetically displeasing. Cooling after the ingredient suspension application must be controlled to enable capillary condensation of the nondigestible fat into the surface porosity, but avoiding rapid viscosity increases via crystallization that can create an inertial barrier to absorption resulting in a greasy film appearance. Applying the ingredient suspension to a heated food surface can enable improved absorption of the edible fat into the food product, for example hot potato chips exiting the fryer. Product surface temperatures above about 93° C. (about 200° F.) may be necessary to eliminate any edible fat appearance.

In a preferred embodiment, where the edible oil is a nondigestible oil comprises a solid component with a melting point above about 37° C., as in the case of the nondigestible fat Olean®, the ingredient suspension is preferably added onto the food product as it exits the baking or frying processor at an elevated temperature. The residual heat in the baked or fried food product can melt substantially completely the solid component of the nondigestible fat, permitting the nondigestible fat to be readily absorbed into the matrix of the product, and leaving the suspended ingredient powders adhered to the food product surface without loss of ingredient efficacy. The absorption of the nondigestible oil into the matrix of the food leaves the food usually with no greasy appearance.

If the snacks are fried in a fat and then steam stripped to remove fat from the surface of the fried food, the ingredient suspension is added to the fried snacks after the steam stripping operation. For extruded snacks, which are not baked or fried, the suspension is added as the hot product emerges from the extruder.

The present invention allows accurate and precise metering/addition of ingredients at a lower level than previously possible, which can eliminate objectionable off-flavor. Additionally, the nondigestible fat further lowers off flavor by acting as a flavor masking agent. Suspending the ingredient powder or encapsulated ingredients in a semi-solid nondigestible fat further helps control off-flavor that may develop in the ingredients by acting as an encapsulate. It also lowers delivery costs of the ingredients significantly, since the dispensing of ingredient powder is more easily controlled when it is suspended in the nondigestible fat (less overusage and loss), and the ingredient powder does not readily separate into individual ingredient species, avoiding any need to have powdered or encapsulated ingredients with narrow or specific particle size profiles. There are no significant levels of airborne ingredients generated eliminating a potential occupational health issue.

G. Methods a) Water Absorption

In general, the "Water Absorption Index" and "WAI" refers to the measurement of the water holding capacity of any carbohydrate based material as a result of a cooking process. (See for example Anderson, R. A., Conway, H. F., Pfeifer, V. F. and Griffin, Jr., E. L., 1969, Gelatinization of Corn Grits By Roll- and Extrusion-Cooking. CEREAL SCIENCE TODAY; 14(1):4). This measurement is typically expressed as the ratio of mass of water held per unit mass of material. The WAI for a sample is determined by the following procedure. The weight to two decimal places of an empty centrifuge tube is determined. Two grams of dry sample (e.g., potato flakes) are placed into the tube. Thirty milliliters of water is added to the tube. The water and sample are stirred vigorously to insure no dry lumps remain. The tube is placed in a 30° C. (85° F.) water bath for 30 min., repeating the stirring procedure at 10 and 20 min. The tube is then centrifuged for 15 min. at 3,000 RPM. The water is then decanted from the tube, leaving a gel behind. The tube and contents are weighed. The WAI is calculated by dividing the weight of the resulting gel by the weight of the dry sample (i.e., [weight of tube and gel]−[weight of tube]÷[weight of dry flakes]).

While this invention has been described as having preferred embodiments and compositions, the present invention can be further modified with the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

b) Rheology Method for Edible Oils

The Consistency (K) of the nondigestible oil is measured at a temperature between 20° and 40° C. using a Rheometrics controlled stress rheometer equipped with a cone and plate measuring system. The cone diameter is 4 cm and the cone angle is 2 degrees. A sample of the edible oil is carefully applied to the plate and the cone is then slowly lowered onto the sample (gap=0.048 mm). A flow measurement is performed via the programmed application of a shear stress over time. The shear stress is increased from zero to 5,000 dynes/cm$^2$ over a 2 minutes time span. The applied stress results in deformation of the sample (i.e., strain) and the rate of strain is reported as a shear rate. These data are used to create a flow curve of log [apparent viscosity] versus log [shear rate] for the nondigestible oil sample. The flow curve is then modeled according to the following power law model:

$$\text{Apparent Viscosity} = K(\text{Shear Rate})^{n-1}$$

where the apparent viscosity is expressed in units of poise (P), shear rate is in units of 1/sec, K is the Consistency in units of $P.\sec^{(n-1)}$, and n is the shear index (dimensionless). The power law model is widely used to describe the flow behavior of non-newtonian materials. On the log-log plot of apparent viscosity versus shear rate, the power law model is a straight line with slope of (n−1). The shear index (n) varies from 0 to 1. The closer n is to 1, the closer the material's flow behavior is to newtonian behavior. The Consistency (K) is numerically equal to the apparent viscosity at a shear rate of 1 sec$^{-1}$. The values of K and n describe the flow behavior of the nondigestible oil within specific limits of shear.

c) Viscosity Method for Edible Oils

The viscosity of the nondigestible oil is measured at a temperature between 20° and 40° C. using a Rheometrics controlled stress rheometer equipped with a cone and plate measuring system. The cone diameter is 4 cm and the cone angle is 2 degrees. A sample of the edible oil is carefully applied to the plate and the cone is then slowly lowered onto the sample (gap=0.048 mm). The shear rate is set at 10 sec$^{-1}$ in a step rate manner and the viscosity is measured after shear is applied for thirty seconds.

d) Rheology Method for Ingredient suspensions

The Consistency method for the edible oils was modified for the ingredient suspension to account for the effect of the solid ingredient particles on the resultant shear stress. It is important to use a rheometer that controls the shear rate since. The Consistency (K) of the ingredient suspension oil is measured at a temperature between 20° and 40° C. using a Paar Physica MC100 controlled shear rate rheometer equipped with a cone and plate measuring system. An MK23 cone with a diameter of 50 mm and a fixed gap of 0.05 mm from the plate was used for the measurement. The shear rate results in deformation of the sample requiring a given level of torque to maintain the rate against the inertial forces of the sample. The torque required is reported as a shear stress. These data are used to create a flow curve of log [apparent viscosity] versus log [shear rate] for the nondigestible oil sample. The flow curve is then modeled according to the following power law model:

$$\text{Apparent Viscosity} = K(\text{Shear Rate})^{n-1}$$

where the apparent viscosity is expressed in units of poise (P), shear rate is in units of 1/sec, K is the Consistency in units of $P.\sec^{(n-1)}$, and n is the shear index (dimensionless). The power law model is widely used to describe the flow behavior of non-newtonian materials. On the log-log plot of apparent viscosity versus shear rate, the power law model is a straight line with slope of (n−1). The shear index (n) varies from 0 to 1. The closer n is to 1, the closer the material's flow behavior is to newtonian behavior. The Consistency (K) is numerically equal to the apparent viscosity at a shear rate of 1 sec$^{-1}$. The values of K and n describe the flow behavior of the nondigestible oil within specific limits of shear.

G. Examples

Examples of Making of a Fabricated Potato Chip

The following composition is used to make fabricated potato chips. The dough composition A comprises 35% water (based on the total dough composition), 5% of an emulsifier, and 65% of the following mixture of ingredients:

| Dough Composition A | |
|---|---|
| Ingredient | Wt. % |
| Potato flakes (WAI 8.5) | 79.5 |
| Potato granules (WAI 4.0) | 9.0 |
| Sweet Rice Flour (WAI 2.2) | 6.0 |
| Maltodextrin DE 18 | 4.0 |
| N-Lite LP ™ (WAI 0.7) | 1.5 |

A mix consisting of the dry ingredients, water and emulsifier are blended in a Turbolizerm to form a loose, dry dough (~15–60 seconds). The dough is sheeted by continuously feeding it through a pair of sheeting rolls forming an elastic continuous sheet without pin holes. Sheet thickness is controlled to 0.02 inches (0.05 cm). The front roll is heated to about 90° F. (32° C.) and the back roll is heated to about 135° F. (57° C.). The dough sheet is then cut into oval shaped pieces and fried in a constrained frying mold at 385° F. (196° C.) in Vitamin E enriched OLEAN™ (made by The Procter and Gamble Company) for about 12 seconds. The product is held in the molds for about 20 seconds to allow the OLEAN™ to drain. The resulting product has a crisp texture. The non-digestible fat level is about 30%. The digestible fat level from the emulsifier is less than 0.5 grams/30 gram serving.

The following composition is also used to make fabricated potato chips. The dough composition B comprises 30% water (based on the total dough composition) and 70% mixture of ingredients:

| Dough Composition B | |
|---|---|
| Ingredient | Wt. % |
| Potato flakes | 75 |
| Wheat Starch | 9 |
| Corn Meal | 9 |
| N-Lite LP ™ | 3 |
| Malto-dextrin | 4 |

The wheat starch and corn meal are blended in a Turbulizer™ mixer. The maltodextrin is dissolved in the water and added to the blend. The blend is mixed with potato flakes to form a loose, dry dough. The dough is sheeted by continuously feeding it through a pair of sheeting rolls forming an elastic continuous sheet without pin holes. Sheet thickness is controlled to 0.02 inches (0.05 cm). The dough sheet is then cut into oval shaped pieces and fried in a constrained frying mold at 375° F. for about 12 seconds. The frying fat is a blend of cottonseed oil, corn oil and Olean™ (available from the Procter & Gamble Company). The fried pieces contain about 38% fat.

N-Lite LP is a crosslinked starch available from National Starch and Chemical Company, Bridgewater, N.J. A mix consisting of the dry ingredients is blended with a 15/85 blend of distilled monoglyceride of soybean oil, Dimodan OK, available from Donasco, and Olean®, available from The Procter & Gamble Co., Cincinnati, Ohio. The modified starch is N-Lite LP (1.5% dry). The 6% waxy rice flour helps to increase the sheet strength of the dough. The level of the emulsifier Olean® blend is 5% of the dough. Added water, 35%, and salt (0.4%) are mixed with the dry ingredient and emulsifier blend to form a loose, dry dough in a continuous Turbolizer® mixer with a residence time of 15 to 60 seconds (large scale).

Ingredient Suspension Example 1

A blend of ingredients is suspended in Olean®, available from The Procter & Gamble Company, Cincinnati, Ohio, in the weight proportions shown in Table 1. The ingredients are calcium carbonate and an edible pyrazine-based flavor. The Olean® is made of sucrose polyesters of cottonseed oil and about 7% of a solid sucrose fatty acid octaester of oleic acid and behenic acids. The Olean® is mixed in a 150 pound capacity Hobart beater mixer for 15 minutes until its viscosity is reduced to a flowable consistency of 55. The Olean® at this stage is pumpable and remains at this viscosity indefinitely even after freezing and thawing. All shear thinning and mixing is done at an ambient temperature of 75–80° F. The ingredients are added to the Olean® in the mixer for 15 minutes and blended until the mixture appears homogeneous. The ingredient suspension is transferred to a tank and metered through a pipe with nozzles directly over the product on the belt. The temperature of the ingredient suspension in the transfer tank is about 25 to 32° C.

Fabricated potato chips are made as described above. As the chips emerged from the fryer, they are transferred to a conveyor belt. The chip temperature out of the fryer is about 240° F. (115° C.) to about 260° F. (127° C.). The ingredient suspension is added to the hot chip at about 0.9% by weight of the finished chip. The chips are then cooled at a rate of about 82° C.–107° C./min, thereby ensuring that the nondigestible oil of the ingredient suspension, and used as the frying medium, in the fabricated chip is of a stiffened form and provides the required passive liquid oil loss control.

The level of Olean® in the chips, including the Olean® used as the frying medium and the Olean® used in the ingredient suspension, is about 30–33% by weight of the total chip.

TABLE 1

| Ingredient | Wt. % |
| --- | --- |
| Calcium carbonate | 15 |
| Edible pyrazine-based flavor | 2 |
| Olean® | 83 |

The following dough composition samples are prepared and used to apply the ingredient suspension of Example 1.

Dough Composition C

The following composition is used to make fabricated potato chips. The dough composition C comprises 35% water (based on the total dough composition), 5% emulsifier, and 65% of the following mixture of ingredients:

| Ingredient | Wt. % |
| --- | --- |
| Potato flakes (8.5 WAI) | 72.8 |
| Potato granules (4.0 WAI) | 8.2 |
| Cereal Crisp (6.9 WAI) | 4.0 |
| Maltodextrin DE 18 | 4.0 |
| N-Creamer 46 ™ (1.7 WAI) | 1.0 |

Dough Composition D

The following composition is used to make fabricated potato chips. The dough composition D comprises 35% water (based on the total dough composition), 5% emulsifier, and 65% of the following mixture of ingredients:

| Ingredient | Wt. |
| --- | --- |
| Potato flakes (8.5 WAI) | 82 |
| Ultra-Sperse ™ (3.7 WAI) | 4.0 |
| Maltodextrin DE 18 | 4.0 |
| Potato Granules (4.0 WAI) | 9.0 |
| N-Creamer 46 ™ (1.7 WAI) | 1.0 |

Dough Composition E

The following composition is used to make fabricated potato chips. The dough composition E comprises 35% water (based on the total dough composition), 5% emulsifier, and 65% of the following mixture of ingredients:

| Ingredient | Wt. |
| --- | --- |
| Potato flakes (8.5 WAI) | 82 |
| Ultra-Sperse ™ (3.7 WAI) | 4.0 |
| Maltodextrin DE 18 | 4.0 |
| Corn Flour (4.0 WAI) | 9.0 |
| N-Creamer 46 ™ (1.7 WAI) | 1.0 |

Dough Composition F

The following composition is used to make fabricated potato chips. The dough composition F comprises 35% water (based on the total dough composition), 5% emulsifier, and 65% of the following mixture of ingredients:

| Ingredient | Wt. % |
| --- | --- |
| Potato flakes (8.5 WAI) | 82.4 |
| Potato Granules (4.0 WAI) | 9.2 |
| Soft Wheat Flour (1.7 WAI) | 3.4 |
| Maltodextrin DE 18 | 4.0 |
| N-Creamer 46 ™ (1.9 WAI) | 1.0 |

Dough Composition G

A dough composition G is prepared and comprises 30% water and 70% of the following mixture of ingredients:

| Ingredient | Wt. % in mixture |
| --- | --- |
| Potato flakes | 78 |
| Wheat Starch | 9 |
| Corn Meal | 9 |
| Malto-dextrin | 4 |

Dough Composition H

A dough H is prepared from the following ingredients:

| Ingredient | Wt. % of total formula |
| --- | --- |
| Potato flakes | 53.10 |
| Potato granules | 5.90 |
| Maltodextrin | 4.50 |
| Water | 32.70 |
| *Emulsifier | 3.00 |
| Sugar | 0.40 |
| Salt | 0.40 |

What is claimed is:

1. A ingredient suspension comprising:
   a) a flowable edible fat; and,
   b) an ingredient,
wherein the ingredient suspension is pumpable; wherein said ingredient is selected from the group consisting of flavors, minerals, nutrients, colorants, aromas, caffeine, stimulants, and mixtures thereof; and wherein the edible fat is a nondigestible fat less than 1 poise at 100° F. after 10 minutes of steady shear at a rate of 10 seconds$^{-1}$.

2. The ingredient suspension of claim 1 wherein said ingredient is oil soluble.

3. The ingredient suspension of claim 1 wherein said ingredient further comprises at least one vitamin.

4. A method of fortifying a food product with food-additive ingredients, comprising the steps of:
   1) preparing a flowable ingredient suspension containing an ingredient and a flowable edible fat, wherein the preparation of said flowable ingredient suspension comprises the steps of;
      i) preparing a flowable edible fat, and
      ii) admixing said flowable edible fat with the ingredient to form said flowable ingredient suspension;
   2) adding a controlled amount of said flowable ingredient suspension to said food product; and wherein the flowable edible fat is a nondigestible fat having a Consistency of less than 600 P.sec$^{(n-1)}$ in a temperature range of from 20–40° C.

5. A method of fortifying a food product with food-additive ingredients, comprising the steps of:
   1) preparing a flowable ingredient suspension containing an ingredient and an edible fat, and
   2) adding a controlled amount of the ingredient suspension to the food product;

wherein the food product is at a temperature which is sufficient to melt completely a solid component of the edible fat of the ingredient suspension, and wherein the ingredient suspension is metered onto a surface of the food product, whereby the edible fat of the ingredient suspension is melted and absorbed into the food product.

6. The method of claim 5 wherein the food product is a fabricated snack.

* * * * *